US012126586B2

(12) United States Patent
Viklund et al.

(10) Patent No.: US 12,126,586 B2
(45) Date of Patent: *Oct. 22, 2024

(54) MESSAGING SYSTEM

(71) Applicant: KING.COM LIMITED, St. Julians (MT)

(72) Inventors: David Viklund, Stockholm (SE); Driss Louriagli, Stockholm (SE); Pontus Lundwall, Stockholm (SE)

(73) Assignee: KING.COM LIMITED, St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,296

(22) Filed: Feb. 3, 2023

(65) Prior Publication Data

US 2023/0179553 A1 Jun. 8, 2023

Related U.S. Application Data

(63) Continuation of application No. 17/092,856, filed on Nov. 9, 2020, now Pat. No. 11,575,630, which is a continuation of application No. 16/511,361, filed on Jul. 15, 2019, now Pat. No. 10,834,039, which is a continuation of application No. 15/901,346, filed on Feb. 21, 2018, now Pat. No. 10,374,994.

(51) Int. Cl.
*H04W 4/12* (2009.01)
*H04L 51/10* (2022.01)

(52) U.S. Cl.
CPC ............... *H04L 51/10* (2013.01); *H04W 4/12* (2013.01)

(58) Field of Classification Search
CPC .......... H04W 4/02; H04W 4/06; H04W 4/08; H04W 4/12; H04W 4/21; H04W 4/80; H04W 12/08; H04W 84/20; H04L 63/104; H04L 51/00; H04L 5/10; H04L 51/22; H04L 7/00; H04L 51/18
See application file for complete search history.

(56) References Cited

U.S. PATENT DOCUMENTS

| | | | |
|---|---|---|---|
| 5,966,652 A | 10/1999 | Coad et al. | |
| 6,035,206 A * | 3/2000 | Thurston | H04W 84/08 455/503 |
| 6,353,923 B1 | 3/2002 | Bogle et al. | |
| 7,756,536 B2 * | 7/2010 | Camp, Jr. | H04L 51/18 455/466 |

(Continued)

*Primary Examiner* — Jean A Gelin
(74) *Attorney, Agent, or Firm* — Saul Ewing LLP

(57) ABSTRACT

A messaging system for both generating and receiving message data, which breaks up a sent message and displays it as a time sequence of message parts on the receiving user's device. Breaks in the sent message are defined by delimiters, which are inserted into the message data by the user on the generate device and are detected by the receiving device. Delimiters or other part of the message data determine the time period for each part of the message. The first part of the message is displayed on the receiving user's device for the time period associated with that part. Once the time period for the first message part has expired, the next message part is displayed in addition to the preceding part. This continues until the whole sent message is displayed, thus creating a timeline of message parts for the receiving user.

19 Claims, 10 Drawing Sheets

(56) References Cited

U.S. PATENT DOCUMENTS

| | | | |
|---|---|---|---|
| 8,554,851 B2* | 10/2013 | Vash | G06F 15/17325 |
| | | | 711/146 |
| 8,787,567 B2* | 7/2014 | McDougal | H04L 63/1441 |
| | | | 380/30 |
| 9,853,926 B2* | 12/2017 | Tussy | H04L 51/066 |
| 11,228,550 B2* | 1/2022 | Abedini | H04W 4/12 |
| 2003/0093806 A1* | 5/2003 | Dureau | H04N 21/47214 |
| | | | 348/E7.071 |
| 2004/0205497 A1 | 10/2004 | Alexander et al. | |
| 2004/0242280 A1 | 12/2004 | Hama | |
| 2006/0018446 A1 | 1/2006 | Schmandt et al. | |
| 2006/0056350 A1* | 3/2006 | Love | H04W 72/20 |
| | | | 455/442 |
| 2006/0200753 A1 | 9/2006 | Bhatia et al. | |
| 2009/0322766 A1 | 12/2009 | Marien | |
| 2010/0004008 A1* | 1/2010 | Abolrous | H04L 51/18 |
| | | | 455/466 |
| 2011/0214088 A1 | 9/2011 | Sandru | |
| 2012/0105455 A1* | 5/2012 | Sharkey | G06F 40/114 |
| | | | 345/473 |
| 2012/0122425 A1* | 5/2012 | Adams | H04L 51/214 |
| | | | 455/412.1 |
| 2012/0162350 A1* | 6/2012 | Lee | H04M 1/7243 |
| | | | 348/14.03 |
| 2013/0145049 A1* | 6/2013 | Stanton | H04L 67/1095 |
| | | | 709/248 |
| 2014/0059448 A1* | 2/2014 | Lee | H04L 51/00 |
| | | | 715/752 |
| 2014/0067965 A1* | 3/2014 | Yamakawa | G06F 3/167 |
| | | | 709/206 |
| 2014/0254466 A1* | 9/2014 | Wurster | H04L 51/18 |
| | | | 370/312 |
| 2014/0351374 A1* | 11/2014 | Canoy | H04L 67/10 |
| | | | 709/217 |
| 2016/0006833 A1* | 1/2016 | Bao | G06F 3/048 |
| | | | 715/746 |
| 2016/0255577 A1* | 9/2016 | Kazmi | H04J 11/00 |
| | | | 370/311 |
| 2016/0259702 A1* | 9/2016 | Mishra | G06F 1/3278 |
| 2016/0269163 A1* | 9/2016 | Wong | H04W 72/23 |
| 2017/0054843 A1* | 2/2017 | Ezell | H04M 3/4872 |
| 2017/0078235 A1* | 3/2017 | Cannata | H04L 51/224 |
| 2017/0169800 A1* | 6/2017 | Greco | H04L 67/5681 |
| 2017/0201479 A1* | 7/2017 | Liu | G06F 3/0481 |
| 2017/0265046 A1 | 9/2017 | Chen et al. | |
| 2017/0325171 A1* | 11/2017 | Xu | G06F 21/6209 |
| 2017/0336943 A1* | 11/2017 | Chaudhri | G06F 3/0412 |
| 2017/0336960 A1* | 11/2017 | Chaudhri | H04L 51/18 |
| 2017/0346767 A1* | 11/2017 | Yamakawa | H04L 51/04 |
| 2018/0054400 A1* | 2/2018 | Akopian | H04L 43/18 |
| 2018/0089304 A1 | 3/2018 | Vizer et al. | |
| 2018/0091407 A1* | 3/2018 | Tervonen | H04L 43/103 |
| 2018/0183901 A1 | 6/2018 | Lariviere et al. | |
| 2018/0324268 A1* | 11/2018 | Jodlauk | H04L 67/565 |
| 2019/0149965 A1* | 5/2019 | Jahr | G06F 9/4401 |
| | | | 370/329 |
| 2019/0312612 A1* | 10/2019 | Stefan | H04B 5/72 |

* cited by examiner

MESSAGING SYSTEM

CROSS-REFERENCE TO RELATED APPLICATIONS

This is a continuation of U.S. application Ser. No. 17/092,856, filed on Nov. 9, 2020, which is a continuation of U.S. application Ser. No. 16/511,361, filed on Jul. 15, 2019, which is a continuation of U.S. application Ser. No. 15/901,346, filed on Feb. 21, 2018, the entire contents of which being fully incorporated hereby by reference.

TECHNICAL FIELD OF THE INVENTION

The present disclosure relates to rendering and generating message data to be exchanged between transmitting and receiving devices.

BACKGROUND OF THE INVENTION

Messaging systems are widely available, enabling computer devices such as smartphones, tablets and other forms of computer devices to exchange messages via a communication network. Generally, one or more message server is provided which performs the function of receiving, storing and transmitting messages between computer devices. There are now available many different 'apps' for enabling communication between users of computer devices in such messaging systems. Communication networks can be enabled in a large number of different ways, including wired and wireless. Wireless networks operate using telecommunications protocols, or shortwave protocols such as Wi-Fi or Bluetooth. To use these apps, a sending user composes a message at his device, and identifies one or more other users to receive the message. When he implements a send function (for example by pushing an icon marked send on his device), the device generates message data, which may involve adding headers and tailers to the message that has been composed by the user, the header including an address or addresses of the receiving users. The message is transmitted (it may be broken up into packets for transmission) over the communications network, via the one or more server, to the receiving user.

It is commonplace to communicate using such messages. They have evolved from so-called SMS messages to more sophisticated messages which may be sent with animations and images. For example, video messaging is becoming increasingly common.

While being more engaging, video messaging is expensive in terms of the bandwidth that it uses up, and there may be situations where bandwidth is constrained and the exchange of video messages becomes frustrating.

In other scenarios, a person may not wish to send a video message, but nevertheless may wish to make his message entertaining.

SUMMARY OF THE INVENTION

The present inventors have developed a messaging system and method which addresses these issues. The system may comprise a message generating device and a message receiving device in communication via a communication network, the devices as defined in the following. According to one aspect there is provided a method of rendering message data of a message received at a receiving computer device, the method comprising:

a method of rendering message data of a message received at a receiving computer device, the method comprising:
detecting a first viewable element in a first part of the message data;
detecting a delimiter in the message data;
determining a first time period for delaying activation of a second part of the message;
displaying a first part of the message defined by the delimiter in the message data, the first part comprising the first viewable element; and
after expiry of the first time period generating a user perceptible activation associated with the second part of the message, to be perceived by a user at the receiving computer device while the first part of the message is displayed.

The message data may comprise at least one triggering component, the method comprising detecting the triggering component and triggering an event associated with the triggering component.

The user perceptible activation may be a visualisation, a haptic event or an audio event.

The visualisation associated with the second part of the message may be a second viewable element in the second part of the message, or it may be a visual event which is triggered by a viewable or a non-viewable element in the second part of the message.

First and second viewable elements of the message may be displayed in a message display area, whereas the events which are triggered by the triggering components may be displayed in a separate area, which could typically be larger than the message display area.

The first part of the message may comprise an additional non-viewable element which can cause the first time period to be extended. For example, the first viewable element may be associated with a time period sufficient for certain people to view it, but there may be situations where the sender realises that the person who will be viewing the message will need extra time, and therefore an additional time control element may be inserted.

Timing control may be determined at the receiving device or at a generating device where the message is generated by a transmitting user. In one embodiment the first time period is determined by timing control data forming part of the message data in the message received at the receiving computer device. This timing control data may be inserted by the user who has generated the message at the generating device. Alternatively, the timing control data may be inserted by the generating device itself responsive to the element selected by the user to compose the message.

In an alternative embodiment, the first time period may be determined by parsing the message at the receiving computing device, wherein the first time period is defined by the parsed message data. In this embodiment, there is no explicit timing control data in the received message. The message parts control the timing, using timing control information which is stored locally at the received side and which is associated with the delimiter or other elements in the message data. In one embodiment, the first time period is defined by the parsed message data by deriving it from elements of the parsed message data, for example by looking up associated delays in a timing control library.

The delimiter may form part of the first message part, or may follow the first message part. The delimiter may be associated with a delimiter time period which forms all or part of the first time period.

The triggering component may be provided in the first message part, by the delimiter or the second message part.

There may be multiple delimiters, one or more of which could constitute a triggering component. Only one of the elements in the message may provide the triggering component, or some or all of the elements in the message may comprise a triggering component.

A visual event which may be triggered could be an animation or an image or any other kind of visualisation. One type of event which can be triggered is a modification to a three-dimensional avatar which is displayed at the receiving computer device. The avatar could be a generic avatar, or it could be an avatar which represents the sender of the message. Alternatively, it could be an avatar representing the receiving user.

Event data for generating an event may be sent as part of the message data in the message received at the receiving computing device. Alternatively, events can be triggered at the receiving device without being sent as part of the message data. To achieve this, the event is stored at the receiving computer device in association with a triggering component identifier which identifies the triggering component to trigger the event. When a triggering component is detected in a message, the triggering component identifier associated with that message is determined and is used to access a local store which holds events in association with triggering component identifiers. In this way, the event to be triggered may be determined.

Events triggered by triggering components may be generic, or they may be made specific to particular sessions. The term session is used herein to denote an open communication pathway between sender and receiver as is known in the art. A session exists between two endpoints. In group chat, multiple sessions may exist from a sending user to multiple receiving users. Each session would have a session identifier associated with it. Events may be stored in association with session identifiers and triggering component identifiers, whereby an event which is triggered can be uniquely determined for that session. This feature also allows events to be uniquely associated with triggering component identifiers for particular receivers. That is, a sender could send a message to multiple receivers. These receivers could see the message differently because different events would be triggered at their own devices based on the events stored at their local device associated with the triggering component identifier. That is, multiple events may be associated with respective multiple session identifiers for the same triggering component identifier.

Receiving computer devices may receive update messages which comprise event data for generating an event with an associated triggering component identifier, such that a local store of the receiving device can be updated, with the triggering component identifying its associated event. This allows sending users to control what the receiving user will see when they open a message from that device which has sent the message. Alternatively, update messages could be sent from some central server to change events associated with particular triggering components in a more generic fashion, perhaps amongst a social network of users.

The viewable element in the message data could be humanly readable text or icons or any other selectable characters. The triggering component can take the form of an icon having a visual appearance associated with the visual appearance of the triggered event. This is a particularly intuitive and interesting way for a user to receive a message. That is, they see an icon in a message display part on the screen of their device, and an associated animation or image is shown to them in the larger area of their screen separate from the message display area. This provides for a particularly engaging message. One example of a haptic event might be vibration of the receiving device while a beating heart is shown. One example of an audio event might be bird song while an image of a bird is shown.

Another aspect of the disclosure provides a method of generating message data at a computer device for transmission to a receiving computer device, the method comprising:
  a method of generating message data at a generating computer device for transmission to a receiving computer device, the method comprising:
  receiving at least one first viewable element selected by a user at an input component of the generating computer device, the first element to be viewed in a first part of the message;
  receiving a second part of the message input by the user; and
  composing message data comprising the first and second message parts and timing control data which causes the message data received at the receiving computer device to be rendered as a time sequence in which a user perceptible activation associated with the second message part is delayed for a first time period controlled by the timing control data after displaying the first viewable element of the first message part.

The step of composing the message data may comprise including identification of an event to be triggered by a triggering component of the message.

The user perceptible event may be a second viewable element selected by the user in the second message part. Alternatively, it may be an event (visual, haptic or audio) which is triggered by a non-viewable triggering component element in the second message part.

The method of generating message data can comprise receiving a delimiter selected by the user, the delimiter defining a separation between the first and second message parts.

While the message data is being generated, a modified version of a 3D avatar may be displayed, wherein the modification is in accordance with an event to be triggered. This avatar may be displayed while composing the message for transmission to make message composition more interesting.

Another aspect provides a computer device configured to receive a message comprising message data, the computer device comprising:
  processing circuitry configured to execute a computer program which, when executed, causes the processing circuitry to carry out the steps of:
  detecting a first viewable element in a first part of the message data;
  detecting a delimiter in the message data;
  determining a first time period for delaying activation of a second part of the message;
  displaying a first part of the message on a display of the computer device, the first part of the message defined by the delimiter in the message data the first part comprising the first viewable element;
  after expiry of the first time period generating a user perceptible activation associated with the second part of the message, to be perceived by a user at the receiving computing device while the first part of the message is displayed.

Another aspect provides a computer device comprising processing circuitry which is configured to execute a computer program which, when executed by the processing circuitry, causes the computer device to carry out the steps of:

receiving at least one first viewable element selected by a user at an input component of the computer device, the first viewable element to be viewed in a first part of the message;

receiving a second part of the message input by the user;

composing message data comprising the first and second message parts and timing control data which causes the message data received at the receiving computing device to be rendered as a time sequence in which a user perceptible activation associated with the second message part is delayed for a first time period controlled by the timing control data after displaying the first viewable element of the first message part.

Another aspect provides a messaging system comprising a generating computer device configured to generate message data defining a message, and a receiving computer device configured to receive the message data, the receiving computer device comprising processing circuitry configured to execute a computer program which, when executed, causes the receiving computing device to carry out the steps of:

detecting a first viewable element in a first part of the message data;

detecting a delimiter in the message data;

determining a first time period for delaying activation of a second part of the message;

displaying a first part of the message defined by the delimiter in the message data, the first part comprising the first viewable element; and after expiry of the first time period generating a user perceptible activation associated with the second part of the message, to be perceived by a user at the receiving computer device while the first part of the message is displayed.

Another aspect provides a computer program product comprising computer executable instructions which, when executed by a processor causes it to carry out the steps of any of the methods defined above. The computer executable instructions could be stored in transitory or non-transitory media.

BRIEF DESCRIPTION OF THE DRAWINGS

For a better understanding of the present invention and to show how the same may be carried into effect, reference will now be made to the following drawings wherein.

DETAILED DESCRIPTION OF EXAMPLE EMBODIMENTS

The present description describes a messaging system in which devices which communicate over a network are provided with an "app" which breaks up messages to enable a timeline of message parts and events to be perceived on a receiving device. The timeline allows animations or images such as moving 3D avatars, emojis, speech bubbles, and pictures to be incorporated and to be presented as part of a sequence of time separated displayed message parts at the receiving device rather than in a single presentation as is currently the case. Events may be other user perceptible activations, such as physical (e.g. vibrations of a device) or audio (e.g. sounds or songs).

The new messaging app described herein therefore allows for a more creative and engaging experience for the recipient of a message.

The term "app" used herein is used in its conventional form as an abbreviation for an application which is installed on a computer device. Such an application may be provided in the form of a downloadable piece of software or code sequence installable on a processor of a device. It is possible to implement the functionality of the messaging app by installing suitable software on the device other than by a downloadable application, for example as part of the operating system. The functionality could be implemented in other ways, for example in firmware or dedicated hardware.

Figure 1:
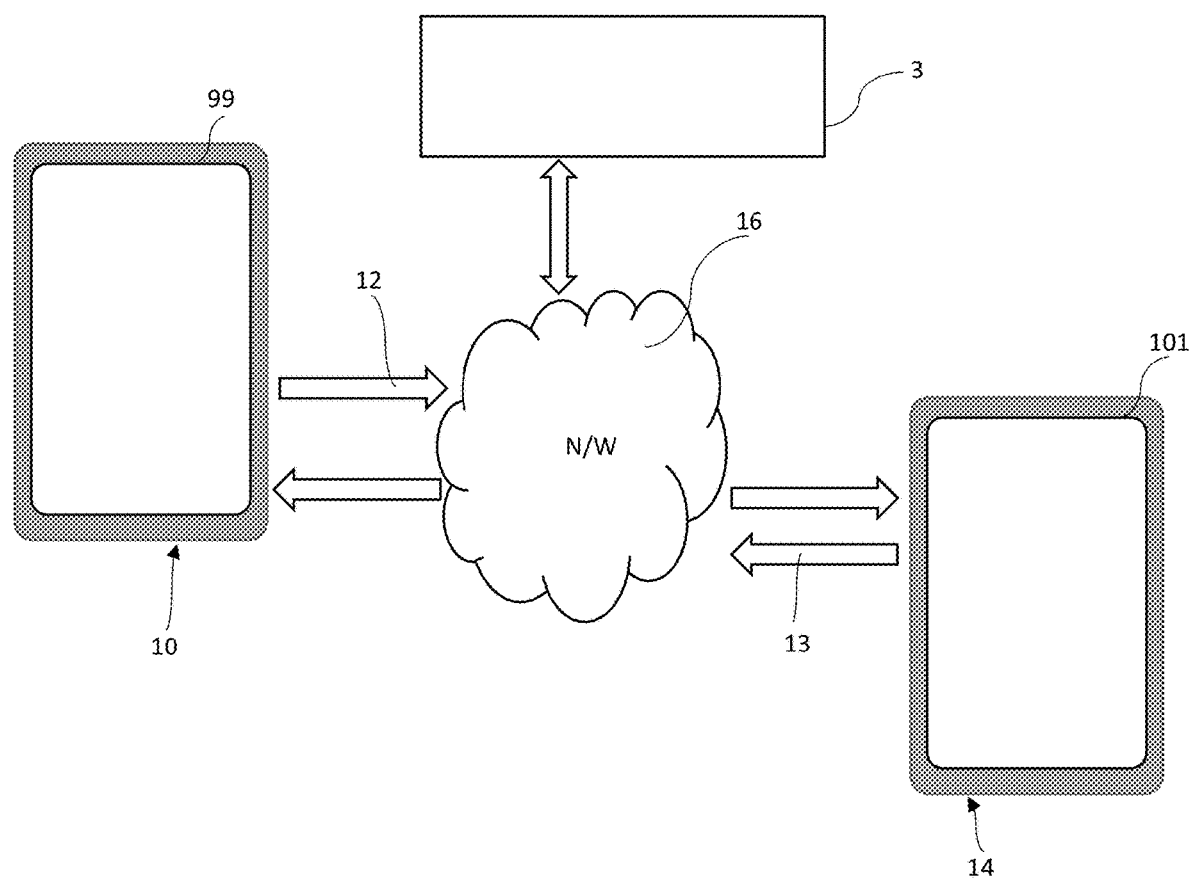
FIG. 1 is a schematic block diagram of two devices in communication over a network.

FIG. 1 is a schematic block diagram of a messaging system showing a first user device 10 which in the following description acts as a generating device for generating a message. The message 12 is transmitted from the generating device 10 to a receiving device 14, the message comprising message data which causes a sequence of message parts to be provided to a user at the receiving device in accordance with a timeline. The message can be sent from the first device 10 to the second device 14 via any suitable communication means. A communication network 16 is shown connected to a server 3 and the first and second devices. Any form of wired or wireless network can be utilised for transmission of the messages. In one exemplary messaging system, messages 12 from the generating device 10 may be sent to the server 3, where they are stored until the receiving device 14, to which the messages are addressed, is ready to receive them. For example, the receiving device may poll the server for its messages periodically, or when it comes online after a period off line. Alternatively, the server may 'push' messages to the receiving device(s). There may be multiple devices involved, with the single generating device 10 sending a message to multiple receiving devices. Messages which are being sent from one device to another device are addressed in accordance with methods known in the art and which will not be discussed further herein. Each device is associated with a user. It will be appreciated that each device may be capable of operating as a generating device and as a receiving device, however, in the following description it will be assumed that the first device 10 is operating as a generating device and is associated with a user who wishes to generate a message. The second device 14 is associated with a user who will be viewing a received message. Each device has a display 99 and 101 which enables a generating user to create or generate a message, and the receiving user to view a received message. In this context, a user 'viewing' a message implies that all or a part of the message may be displayed. In some embodiment, part of a message may be perceived physically (haptically) or as audio. Operation of the message app from the perspective of the receiving user will firstly be described.

Figure 2:
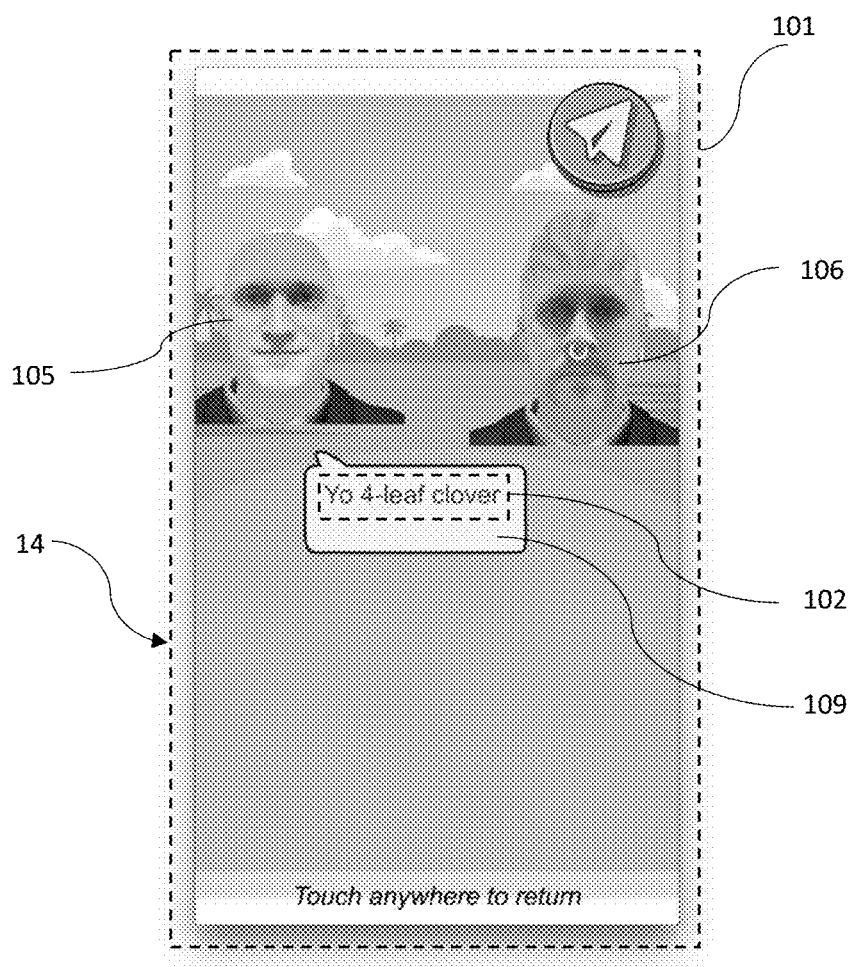
FIG. 2 shows a first screen for displaying a first message part.

FIG. 2 shows the display 101 of the receiving device which has received a complete message comprising a first part 102, a delimiter 103 and a second part. A 'complete' message is a message which is intended to be perceived by a user as a self-contained set of message parts which are perceived in a timed sequence and require no input from the receiving user, but which are self-timed and triggered based on message data within the message. A message may contain further parts and further delimiters between the further parts. Initially, only the first part 102 of the full sent message 12 is displayed in a message display area 109. It remains on the display by itself for a time period. If the delimiter 103 is a viewable element, as is the case in FIG. 3, it is shown after the time period of the first part 102 has lapsed, and may have its own time period associated with it. The total time period determined from the moment at which the viewable element is displayed to a next activation associated with the second message part can be considered a first time period.

Figure 3:
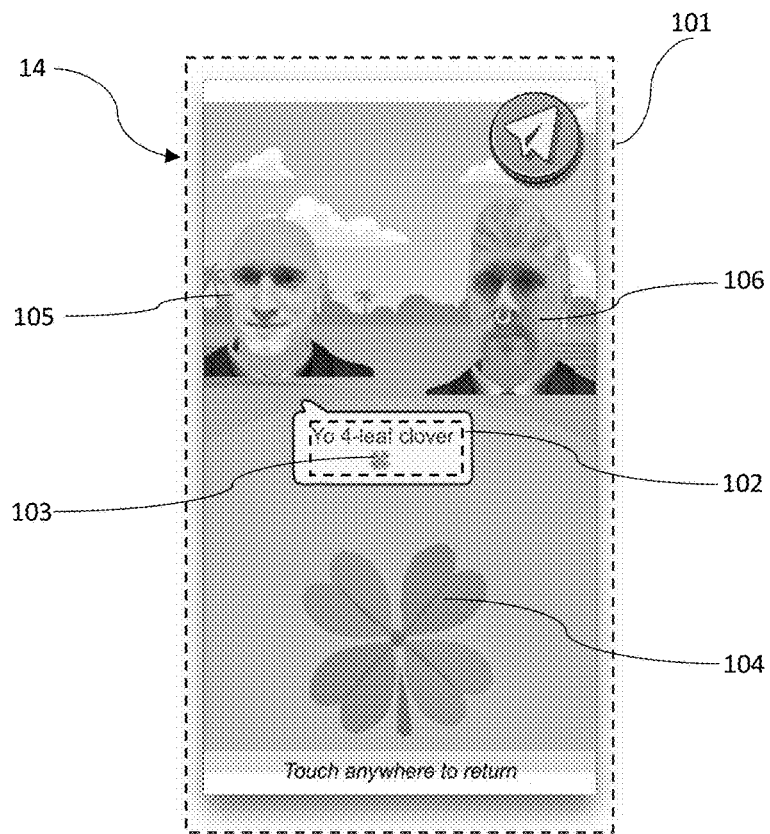
FIGS. 3 and 4 show subsequent message parts being received.

At the end of the first time period, a next user perceptible activation is triggered, associated with a next part of the message. This could be a visualisation or other kind of effect. The delimiter determines a separation between the first part and the next part of the message. Delimiters are explained later, but their core function is to determine a break in the sent message so as to separate the first part from the next part. A message might comprise more than one delimiter, and have multiple message parts. One or more of the message parts might cause an event to be triggered on the receiving side. In some embodiments, a delimiter might itself trigger an event. An event is something which is perceptible to the user, and which is triggered by a triggering element. An event may be a visualisation such as an animation, image or change in expression of an avatar; a haptic event such as physical vibration or change in state of a device; or an audio event such as a song or voice recording. An event may have a time period associated with it and be displayed only for that time period or may be displayed continuously such that it is shown simultaneously with the next part of the message. For example, it could be an animated sequence shown repeatedly in a loop. Delimiters may be displayable elements which can be viewed at the receive side, or may be hidden from view on the receive side. FIG. 3 shows a particular example in which the delimiter 103 is visible and causes an event to be triggered. FIG. 3 shows the delimiter 103 which has the visual appearance of a four leaf clover in the message display area and an event 104 triggered by the delimiter 103 in a different display area 111. In this case, the event is an image which corresponds to the visual appearance of the delimiter, i.e. a four leaf clover. The event is displayed in its own area of the display, separately from the viewable element of the message. The position of an event may be preconfigured or its placement may be defined by event data.

The sending user, referred to as the first user, is represented on the display 101 as a 3D avatar 105, and the receiving, or second, user as a 3D avatar 106. The avatar heads may be moving or stationary. The sender's head may be background sent in the message, discussed later.

Figure 4:
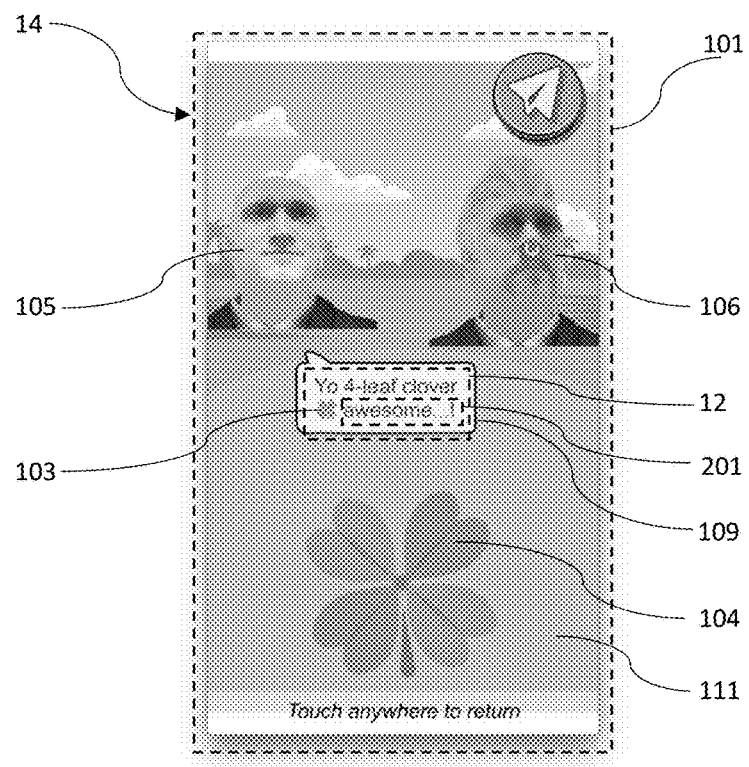

The delimiter 103 is displayed for a further time period. FIG. 4 shows the display 101 after the further time period, displaying a viewable element: 'awesome' of the second part 201 of the message 12, so that the full sent message is now displayed in the message display area 109.

Figure 5:
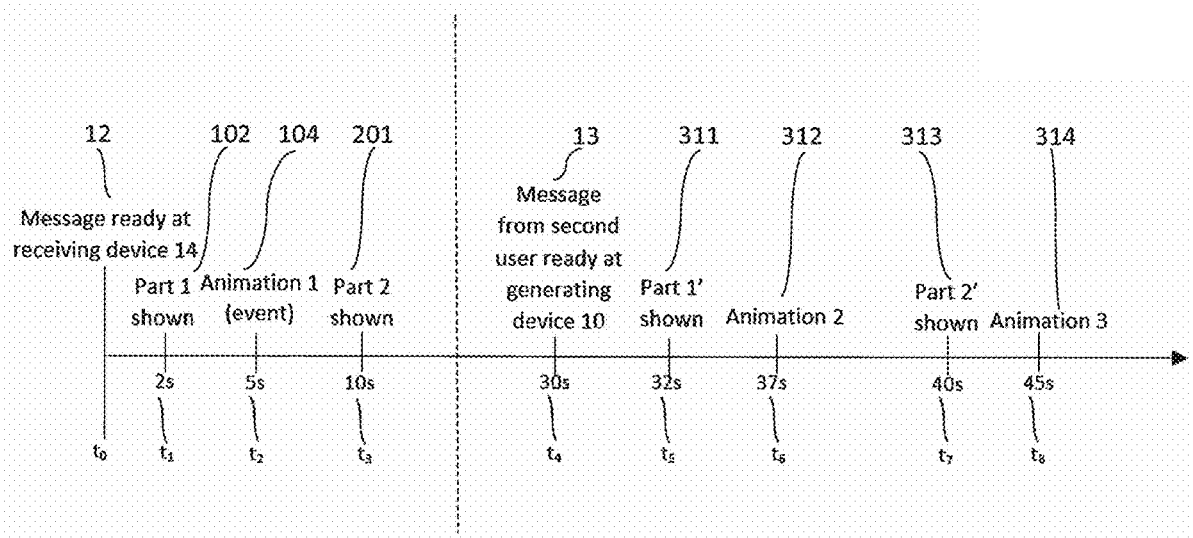
FIG. 5 is a timeline of sending and receiving a message in time separated parts.

FIG. 5 shows a timeline of events for displaying the message at the receiving device 14. At time t0 the receiving device 14 has a complete message 12 ready for presentation to a user. In accordance with embodiments of the invention, the complete message is not all rendered immediately. The full message 12 comprises a first part 102, a delimiter 103 and a second part 201. The receiving device 14 processes the message as described more fully later to determine the timeline for presenting the message. The viewable component, (Part 1), of the first part 102 of the message is displayed by itself on the user display 101 from time t1 to time t2, so in this case for 3 s, and the event 104 associated with delimiter 103 is displayed at time t2, until time t3, that is for 5 s. The event is referred to as 'Animation 1' although in the case of FIG. 2 it is a static image. As discussed, there are many different types of event. The second part 201 of the message is activated at time t3, 10 s after the user received the full message 12, while the viewable component remains in the screen. If a background or any stickers have been sent as part of the message by user 105, these may be displayed prior to the viewable component of the first part 102 of the message, so before time t1, or at the same time as the viewable component at time t1. Background remains on the screen for the entire duration of the complete first message 12.

This is one example of a timeline—in reality there is a vast number of possible configurations. The timeline is controlled by the message as described later. In a conversation, the second user may reply with a message of his own. For example, the second user creates a full message 13 (FIG. 1) which is received at the generating device 10 of the first user at time t4. The message contains first and second parts and two delimiters 103. This is broken into a first part 311 with a viewable component (Part 1'), which appears on the first user's display 99 at time t5 for 5 s, followed by an associated event 312 (Animation 2) at time t6, and a viewable component (Part 2') of the second part 313, which is displayed 3 s later at time t7 for 5 s before being followed by its associated event 314 (Animation 3) at time t8. Note that in some cases the delimiters themselves are not shown, nor do they trigger events. Events are instead triggered by the first and/or second parts of the message respectively. An event may be shown simultaneously with the part of the message that triggers it, or at a short time following it as controlled by the message. The conversation may continue in this manner.

Figure 6:
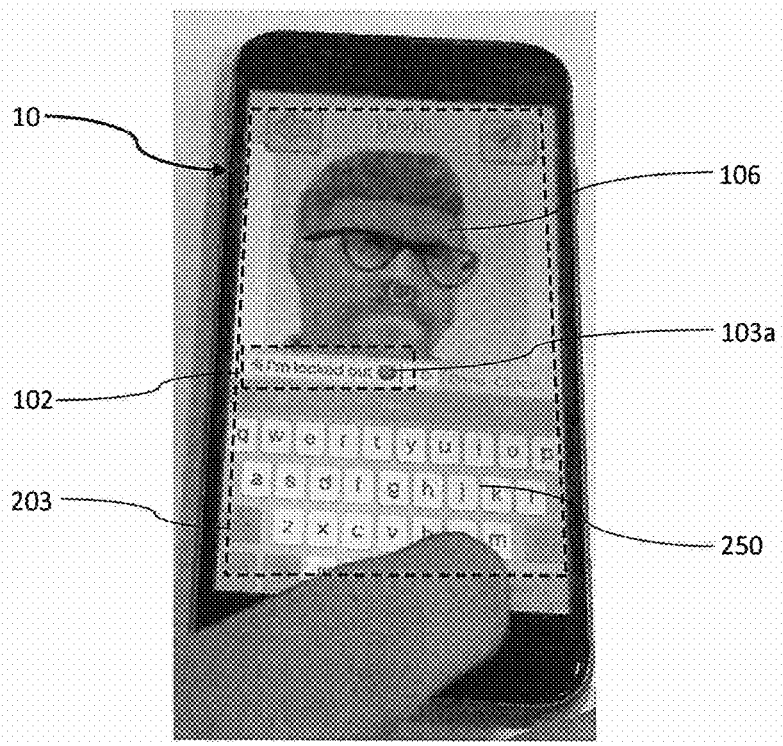
FIG. 6 illustrates a composition screen.

Composition will now be described. The first user composes a message 12, which contains first and second parts and one or more delimiters 103, to be sent to the second user. FIG. 6 shows a composition screen 203 on the first user's device 10. When a user seeks to compose a message, he goes into the message composition screen 203. In this case user 106 is sending the message. In this screen, he can see a 3D avatar image 106. In this case, it is an avatar of himself, but it may be a 'generic' avatar. Note that this image may have been created by using an image of his head and "decorating" it with add-on parts. The 3D avatar can change its orientation or facial expression and these can constitute part of an event or background. While avatars are illustrated and described, it will be appreciated that they are not as essential feature. It is not necessary for any visual indication of the sender or receiver of a message to be displayed.

As shown in FIG. 6, a touch screen keyboard 250, which constitutes an input component, can be used by the user to enter text to form a message. Note that any suitable input component could be utilised, such as a separate keyboard, mouse or voice activation.

The message is formed in parts. FIG. 6 shows a first part of the message as entered in text by the user:

"Hi, I'm locked out ☹ "

Figure 7:
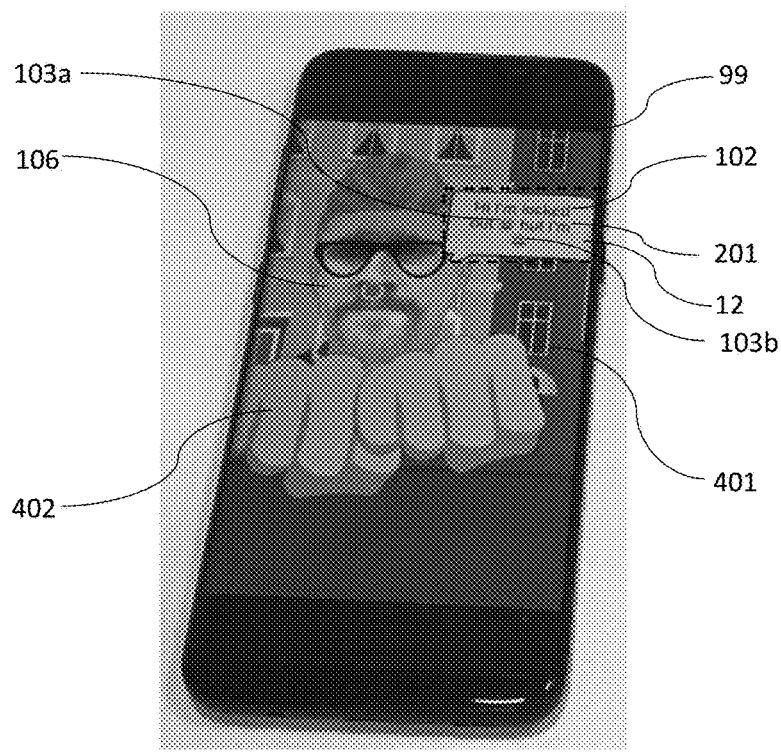
FIGS. 7 and 8 illustrate further steps in composing message data.

In this case, the delimiter 103a is in the form of an emoji with an unhappy expression. This emoji will trigger an event at the receiving device. The event which will be triggered is associated with the emoji 103a, and could be recalled from a library or created by the user as described in more detail later. In this case, the event triggered by the emoji 103a is a change in facial expression of the avatar to unhappy. FIG. 7 shows the next stage of the message composition. In FIG. 7, cartoon hands 402 (stickers) have been added to the image. The user creates a background 401 which can show certain scenery, images etc. and a moving image. In this case the hands can be animated to move as part of the background 401. The background data may be included in the first message part data sent to the receiving device. The user enters a further part of the message:

"But I'm ☺", including another delimiter 103b, this time in the form of a smiling emoji. The smiling emoji has been associated with a different event to be triggered, in this case a change in facial expression of the avatar to smiling. The first and second parts of the message 12, and the two delimiters 103a and 103b are displayed. Note that the background will be displayed at the receive device when this message is displayed.

The composed message is sent to the receiving device, and the user 105 receives the message (in time separated parts) and replies with a message of his own:

"OK too bad ☹"

"I'll be right there ☺"

In the above embodiment, there may be a small delay between the presentation of each word in each message part. Timing control is described in more detail later, but the length of delay may be due to the length of the presented word. This time period may be extended by causing the space between words in the message part to act as a delimiter associated with a predetermined time delay period. The next word is then presented after the total delay, which is a combination of that associated with length of the preceding word and the space between the two words. A 'space' delimiter could be instigated by activation of a space bar key on an input device.

Figure 8:
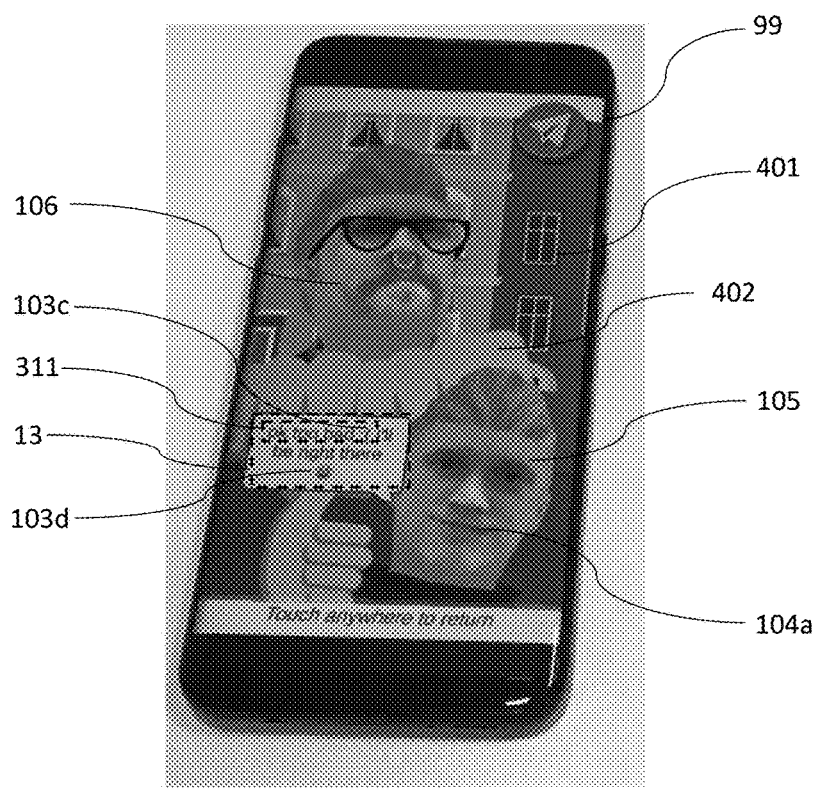

FIG. 8 shows the user display 99 at time t8 after receipt of the message from the second user 105. The 3D avatars 105 and 106 can be seen, along with the background 401 chosen by the user and the hand stickers 402. This message 13 contains two delimiters; a first one 103c (unhappy emoji) after the first part 311 of the message, and a second one 103d (smiling emoji) at the end of the message. The delimiter 103c is associated with an event which is not shown in FIG. 8. The event would be the avatar head of user 105 exhibiting an unhappy expression. The delimiter 103d is associated with illustrated event 104a, the avatar 105 smiling.

The second user may choose to iterate a scene sent by the first user to create the next scene in the timeline. He may choose to keep the background selected by the first user, or choose another background from the available options. The stickers sent by the first user may be removed, moved, rotated, resized, or moved in front of or behind other objects. Additional stickers may also be added. The avatars of both users may also be moved, rotated, or resized as desired. Alternatively, the second user may choose to start with a blank scene, so the background and all the stickers sent by the first user are automatically removed, with only the two avatars shown.

Figure 9:
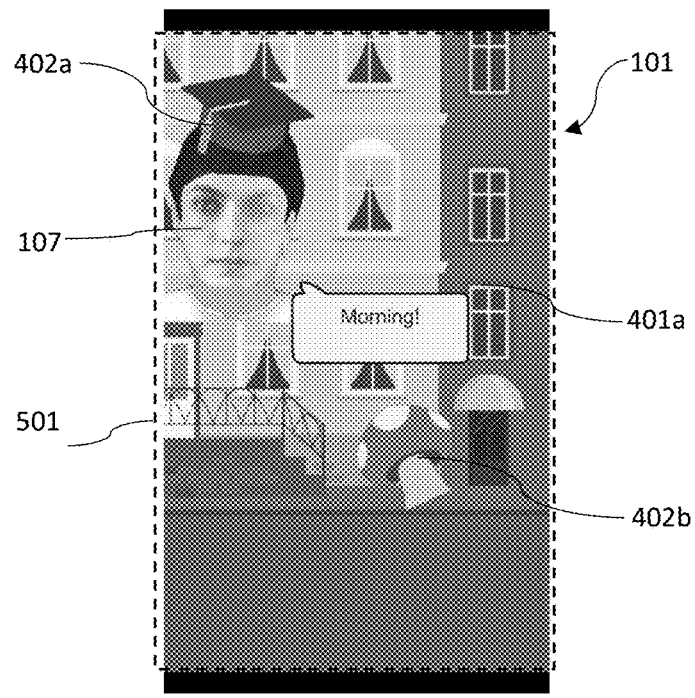
FIGS. 9, 10 and 11 show a sequence of message exchanges wherein background scenes may be iterated.
Figure 10:
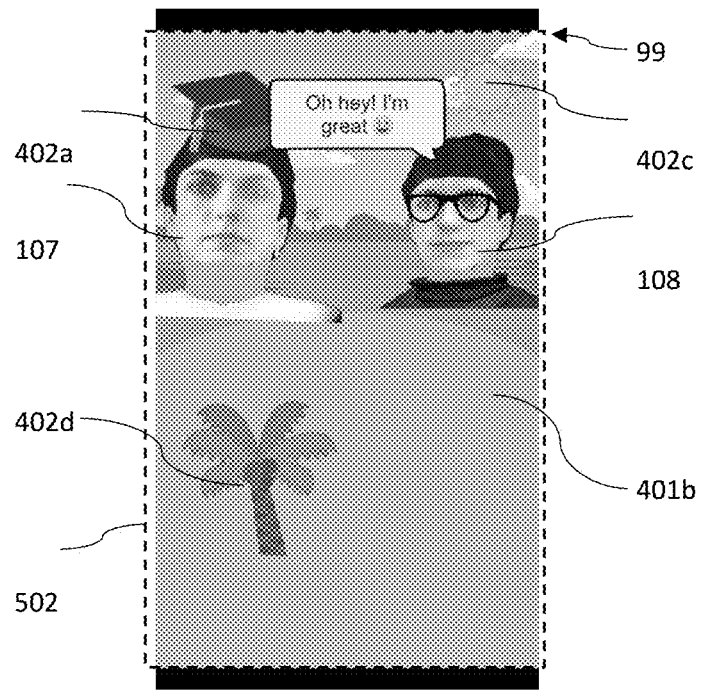

FIG. 9 shows user display 101 with a first scene 501 received from the first user 107. The sending user has selected the background 401a and stickers 402a, 402b. The second user 108 may then choose to generate a responding scene which is sent to the first user 107. FIG. 10 shows the responding scene 502 on user device 99 sent by the second user 108. The second user has changed the background 401b, kept one sticker 402a, deleted one sticker 402b, and added two stickers 402c, 402d.

A series of iterated scenes can be created in this way. One user can send multiple consecutive scenes if desired. The users can select and replay any scenes which have been sent. These scenes can be viewed either in full-screen mode (FIG. 9, FIG. 10) or on a timeline view screen (FIG. 11).

Figure 11:
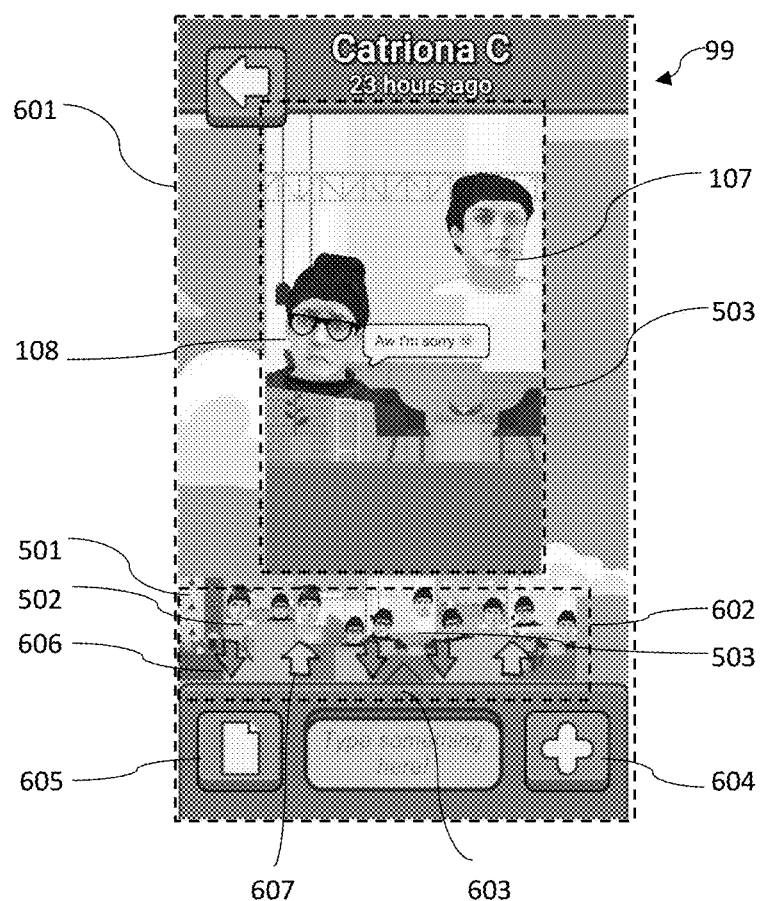

FIG. 11 shows the timeline view screen 601 on user display 99. A fourth scene 503 is being replayed on the screen, having been chosen by the user from a timeline 602 using an arrow 603. Alternatively, the user may scroll through the timeline 602 to choose a scene to replay, with the arrow 603 indicating the chosen scene. It can be seen that in scene 503 the 3D avatars 107 and 108 have both been moved from their locations in the previous scenes, and avatar 108 has been rotated. Thumbnails of scenes 501, 502 and 503, along with the other scenes sent and received by the user, are shown in the timeline 602. A green arrow 606 next to the thumbnail indicates a received scene, and a yellow arrow 607 a sent scene. Reply option buttons are also visible in this view. An iterate scene button 604 is shown, which the user presses in order to have the last sent scene displayed for him to iterate. A blank scene button 605 is also shown, which takes the user to a blank scene showing only the 3D avatars 107 and 108, with all previous backgrounds 401 and stickers 402 removed.

Delimiters can be any entry available to a user at the input component, such as the touchscreen keypad 205, including single letters, words, emojis, paragraph keys, punctuation marks etc.

Some delimiters act to separate the parts of message from each other so that a message can be displayed as a sequence of time separated parts. Some delimiters additionally have a specific event 104 associated with them in the message 12. Multiple delimiters can be place in each message, and can be any combination of either viewable and/or non-viewable elements. For example, a message part may include a viewable element in the form of an emoji, and an additional non-viewable delimiter which triggers an event. Message parts may include time control elements which are not visible. For example a paragraph key would act to extend the time period for which a message part is displayed beyond that associated with the visualisation of the message part.

Message parts may themselves comprise viewable elements or non-viewable elements which also can trigger events. For example, certain words or characters in a message part may trigger certain events. That is, a triggering component for an event may be any part of the message, including the delimiter. Triggering components may have identifiers associated with the same event in all devices, by installation of a common library. For example, a delimiter from the common library may be a smiling emoji, which causes the 3D avatar 105 of the sender to smile. As another example, a phrase 'happy new year' in a message part may cause fireworks to appear as an animation event on the display. Alternatively, triggering components may be personalised to individuals by associating them with an event specific to a user identifier, or to sessions by associating them with an event specific to a session, or by a combinations of these two methods, for example in a group chat. A triggering component specific to an individual chat could be the word 'dog' which then displays a picture of the receiving user's dog on the display 101. Triggering components may also trigger an uninterrupted sequence of animations or other activations (e.g. haptic or audio). An events library 87, 89 which associates triggering component identifiers with events may be provided on the generate and/or receive side.

Events to be triggered can also be defined by the user when he composes a message. In that case, when he enters the triggering component into the message, he creates an event (e.g. an animation) which forms part of the message data to be transmitted with the message. When the triggering component is detected on the receive side (that is, when it is the appropriate time to act on the triggering component), the event which was composed on the generate side is presented on the receive side. This is an alternative to recalling an event from a library on the receive side. Note that a sender may send a triggering component in a message for accessing an event in the library, or send an update to the event library along with a triggering component.

The timed sequence of presentation of the message (displayed parts and/or events) is determined when the message is generated.

The timeline itself can be determined when the message is generated at the generating device, or the receiving device 14. That is, the receiving device 14 may determine the timeline for presenting the message as a sequence of parts, either based on its own parsing of the message or based on timing control data inserted in the message on the generating side.

In the first case, when a message is received at the receiving device, it is parsed until the delimiter is detected. The first viewable element in the first part of the message is displayed for a time period which can be governed by the length of text in the first viewable element, or by some default setting on the receiving device. For example, the time period for display could be based on the number of characters in the first part of the message. For instance, a shorter word like "hi" may have a short time period, for example 2 seconds, whereas a longer phrase "I like you" may be associated with a longer time period, perhaps 4 seconds. The time period could be directly related to the number of characters in the part of the message to be displayed, or could be pre-configured and associated with particular words or phrases to be displayed. Such timing data could be held at a local library 92 in the device. The delimiter itself may also be associated with a particular time period whether or not the delimiter is displayed. After expiry of the time period, any event associated with the delimiter may be displayed for a duration of a further time period which could be curtailed or continuous. After the whole first time period has lapsed, an activation associated with the second message part may be presented with the first viewable element (and the event in some cases) so that the entire message is now presented. The activation could be a second viewable element in the received message part with or without a triggered event, or an event triggered by a non-viewable element in the second message part. In one embodiment, the first viewable element, the delimiter and the second message part define the timeline at the receiving device, because the receiving device has some embedded information in a parsing component for the message which controls how it is displayed. Note that the event could be shown simultaneously with a message part, or triggered by the delimiter.

It will be appreciated that the delimiter itself could be viewable and displayed with the first viewable element, in between the first and second message parts or with the activation of the second message part. It could be displayed at the time at which the event is triggered. Alternatively, the delimiter may itself not be visible (for example it could be a paragraph key which was inserted into the message), but nevertheless it triggers an event.

Note that the event which is triggered by the triggering component can be accessed from a local events library 87, 89 or form part of the message itself. When it is accessed from a local events library, it may be a common event which is always associated with that triggering component, or a personalised or session specific event associated with that triggering component, as described above.

Another way that the timeline can be managed at the receiving device is based on timing control data inserted into the message by the generating device. This timing control data can define the amount of time for which the first part of the message is displayed, how long any triggered event is displayed for and how long the second activation (the whole message) lasts for. This timing control data can be inserted as specific time periods entered by a user when he creates a message. A time management component 90 of the message app on the receive side can read the timing control data associated with each part of the message or with the delimiter and control the display period accordingly.

Another way that the timeline can be managed at the receiving device is something of a hybrid between the first and second ways described above. Time management information may be pre-configured on the receiving device so that the receiving device can manage the timeline as described in accordance with the first way. However, the generating device could generate a timing update for a particular user or a particular session which would override the pre-configured settings on the receiving device for controlling the display of that particular message.

Figure 12:
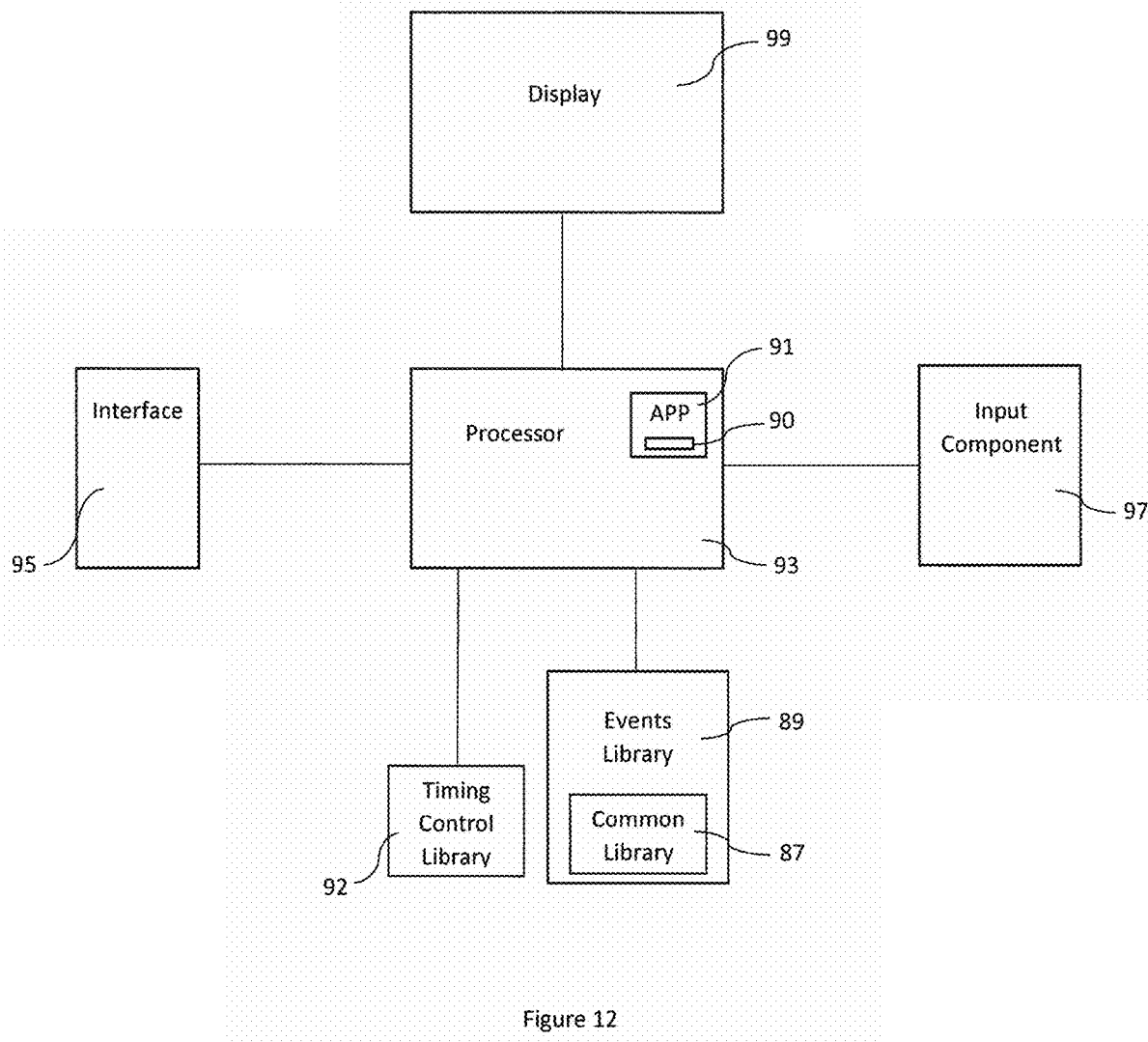
FIG. 12 is a schematic block diagram showing the architecture of a computing device.

Reference will now be made to FIG. 12 which shows a schematic block diagram of the architecture of a computer device suitable to act as a generating device and a receiving device. The device 10 comprises the display 99, an input component 97 and a network interface 95. Where the input component is a touchscreen keypad, it enables a user to generate a message by interacting with the touchscreen keypad 205 to select characters, emojis, stickers, et cetera. Other input components may be utilised as described earlier. Such input components are known and therefore will not be described further. The network interface 95 enables the device to communicate and transmit and receive messages. Once again, such interfaces are known in the art and will not be described further.

The device also comprises a processor 93 on which is installed a messaging app as has been described above in the form of executable computer code. The messaging app 91 can communicate with the input component for the purpose of formulating a message, and with the display 99 for displaying a received message. The app 91 has access to an events library 89 for the purpose of accessing events to be associated with trigger components which are inserted into the message. These events could be accessed automatically when a delimiter is inserted into a message from the events library. The events library could incorporate a common library 87 as described earlier and/or a personalised library. Note that the events library can operate when a triggering component is included in a message on the generating side, or when an event is accessed to be displayed on the display when a message is received. Note in this case there is not necessarily a requirement to 'personalise' events on both the generate and receive side. For example, the word "dog" introduced into a message on the generating side could cause a picture of the receiving user's dog to be animated or displayed at the receiving user's side. Alternatively, the word "dog" could be associated with the sending user's dog by virtue of an associated session ID.

The app includes a timing control component 90 which operates as described above. The timing control component 90 can cooperate with the timing control library 92 which can hold pre-configured settings indicating a time period for which certain characters or character combinations or words should be displayed. Such preconfigured timing control data can be used at the generating side to formulate the message, or on the receiving side to display the message as already described. The timing control data 92 may be updated by an update message which could be session or person-specific.

One of the events which has been described herein is a modification to the facial expression of the avatar representing the users. Avatars may be generated in any known way, and their facial expressions may be modified as known in the art. According to embodiments of the present invention, the modification is triggered in a different way, that is by a triggering component in the message data of a message. Nevertheless, once triggered, modifications to the expressions of the avatars may be handled in a manner that is known in the art and will therefore not be described further herein.

Figure 13:
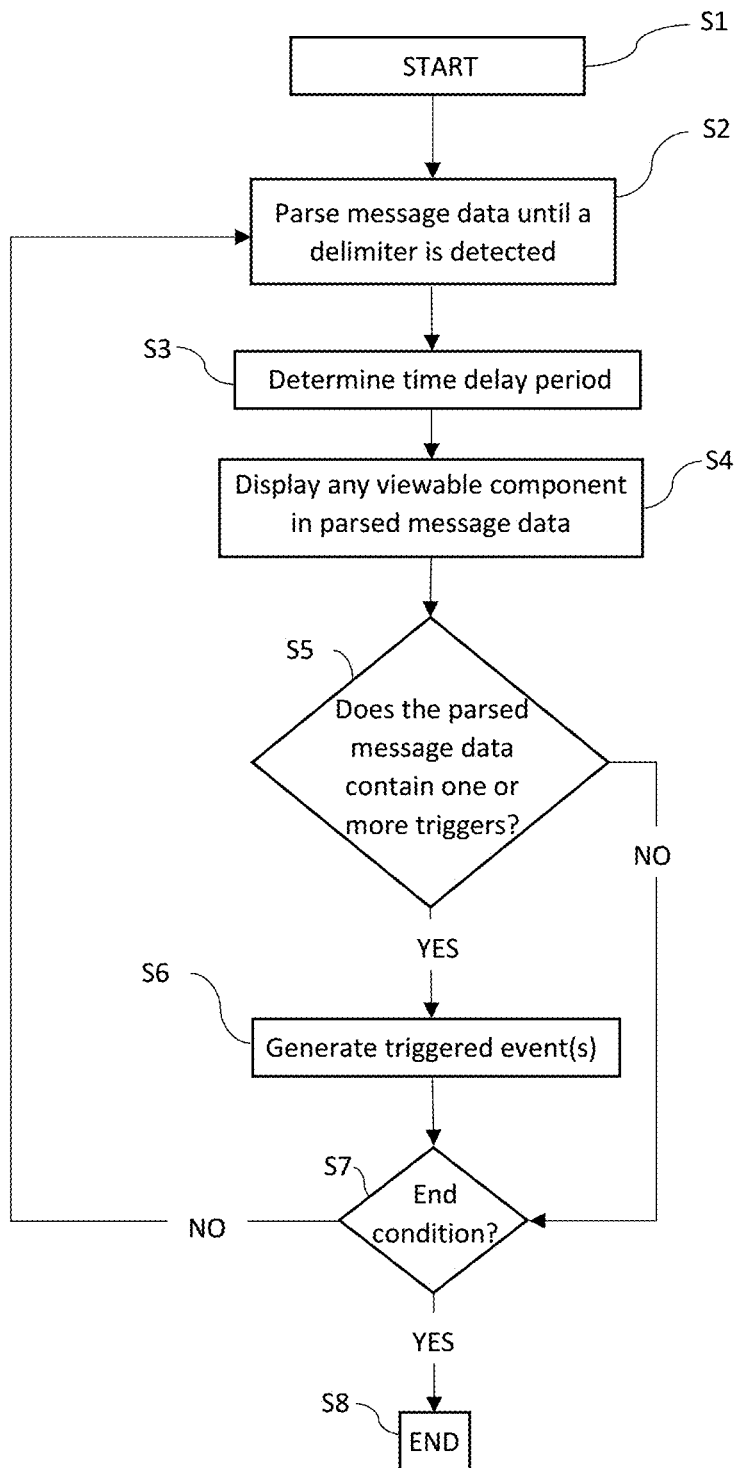
FIGS. 13 and 14 are flow charts of exemplary embodiments.

One example embodiment is shown in the flow chart of FIG. 13. The flow chart of FIG. 13 illustrates steps taken at a receiving device which has received a message ready for display. The message may have been received from the server 3 by a pull or push mechanism and be prepared for presentation to the user immediately after receipt. Alternatively, the message may be received and buffered at the receiving device until such time as the user wishes to view it. Step S1 denotes the start of a process to present a message to a user, either automatically or through user selection.

At step S2, the message data is parsed until a delimiter is detected. Once the delimiter is detected, the process proceeds to step S3 where a delay time period associated with the parsed message data is determined for controlling activation of the message. At step S4, any viewable component in the message data parsed thus far is displayed. If the parsed message data is the first message part, it will contain a viewable component for display. If it is a subsequent message part it may or may not contain any viewable component.

At step S5, the process determines whether the parsed message data contains a trigger. If it does, the triggered event is generated in step S6. Then the process returns back to S2 to parse the next section of the message data. If the message data does not contain a trigger, no further action is taken with this message data, and the process proceeds directly from S5 to S2 to parse the next section of the message data. Note that the delay time period determined at S4 is used to control the activation of the next message part. The next message part is the next section of parsed message data up to the next delimiter that is detected.

Step S7 determines whether an end condition to end the process has been met. For example, an end condition might be that there is no more data to parse at step S2, or that an 'end of message' indicator has been detected. If so, the process ends at S8.

Figure 14:
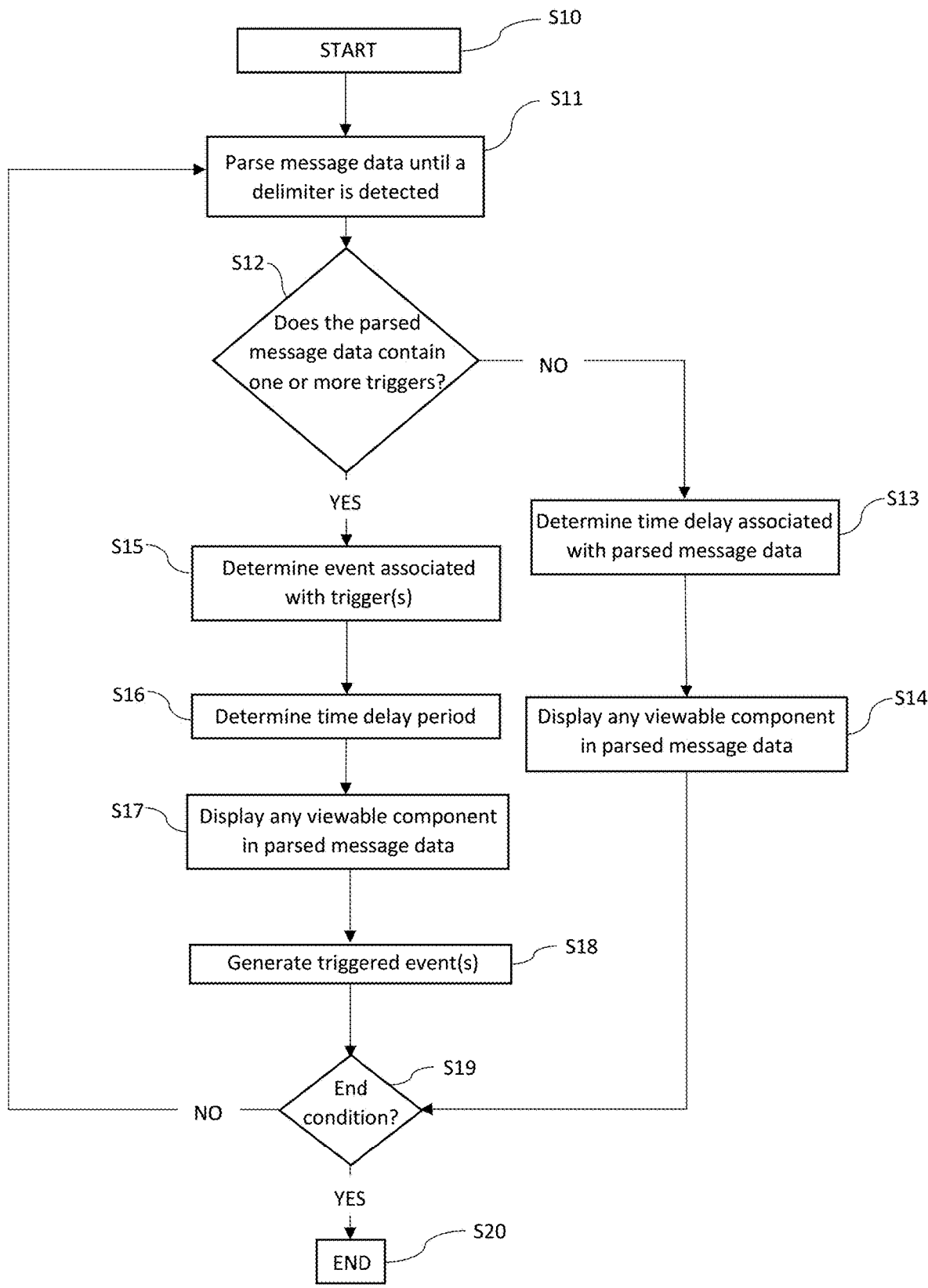

FIG. 14 shows another example embodiment flow chart. It will be appreciated that the order of steps may be altered. For example, steps S4 and S6 could happen together, or S5 and S6 could occur before S4. In this case, a triggered event may be detected before the delay time period is determined. Any delay associated with the triggered event forms part of the delay time period. Step S10 denotes the start of a process to present a message to the user.

At step S11, the message data is parsed until a delimiter is detected. Once the delimiter is detected, step S12 determines if the parsed message data contains a trigger. If the parsed message data does not contain a trigger, the process proceeds to step S13 where the time delay period associated with the parsed message data is determined. Any viewable component of the parsed message data is displayed in step S14. If the parsed message data is the first message part, it will contain a viewable component for display. If it is a subsequent message part it may or may not contain any viewable component. Then the process returns to step S11 and continues to parse the next section of the message data until the next delimiter is detected.

If, at step S12, the system determines that the parsed message data does contain a trigger, the process proceeds to step S15, where the event associated with the trigger is determined. The time delay period associated with the parsed message data including any delay associated with the triggered event is determined at step S16. At step S17, any viewable component in the message data parsed thus far is displayed. If the parsed message data is the first message part, it will contain a viewable component for display. If it is a subsequent message part it may or may not contain any viewable component. The triggered event is generated in step S18. The process then returns to step S11 to parse the next section of the message data. Note that the delay time periods determined at S13 and S16 are used to control the activation of the next message part. The next message part is the next section of parsed message data up to the next delimiter that is detected. S19 determines if an end condition is met and if so the process ends at S20. It will be appreciated that the order of the steps may be altered. For example, S18 could occur before or simultaneously with S17.

The first message part (or subsequent message parts) may include the detected delimiter, such that the delimiter, if it is a viewable element, is displayed at the same time as the viewable elements in the preceding message data. Alternatively, the message parts may exclude the detected delimiter, such that the delimiter, if a viewable element, is displayed at a time after the time delay period of the parsed message data.

In another embodiment, all of the message data may be parsed on receipt of the message at the receiving device before any components are displayed. The viewable elements of the message data are determined, along with the time delays associated with each of them. Any events which may be triggered by components of the message data and their associated time delays are also determined. The system creates a timeline of viewable elements and events to be displayed or activated on the user device, with the times at which each component occurs being the sum of the time delays associated with the preceding components of the message data. Once the timeline has been devised, it is played out on the user device.

It should be noted that the order of the steps in the processes shown in FIGS. 13 and 14 is only an example, and these may be performed in an alternative order or in parallel to one another. Steps S1 and S2, and S10 and S11 must begin the process, but the order of subsequent steps may be altered. For example, steps S4 and S6 may be performed in parallel, or Step S18 may be performed before S17. The exception to this is that, if a step exists to determine if a trigger has been parsed, S5 and S15, any steps which require a trigger to be present in the parsed message data, S6, S15 and S18, must succeed it.

The invention claimed is:

1. A receiving computer device configured to receive messages comprising message data, the computer device comprising:

a timing control component configured to determine a first time period for delaying activation of a second message part of the message data relative to a first message part of the message data when the message is to be perceived by a user; and an events library which stores triggering component identifiers in association with respective events;

wherein each triggering component identifier is associated with a triggering component in the message data and the receiving computer device is configured to access the events library using the triggering component in the message to enable an event stored in the events library in association with the triggering component identifier which is accessed by the triggering component in the message to be perceived by the user at the receiving device, wherein the event is not part of the message which is received by the receiving computer device.

2. The computer device of claim 1 wherein the events library stores a user identifier whereby the associated event is specific to a particular user.

3. The computer device of claim 1 which is configured to determine that the messages are exchanged in a message session with another computer device, wherein the events library stores a session identifier whereby the associated event is specific to a particular message session.

4. The computer device of claim 2 which is configured to determine that the messages are exchanged between multiple computer devices in at least one message session wherein the events library stores a session identifier whereby the associated event is specific to a particular message session.

5. The computer device of claim 4 wherein the at least one session comprises a group chat.

6. The computer device of claim 1 comprising a local store which holds event data for generating each event.

7. The computer device of claim 1 in combination with a message generating device configured to access an events library at the message generating device to identify a triggering component associated with a desired event and to insert the triggering component into the message.

8. The computer device of claim 7 wherein the message generating device is configured to access an event from the events library automatically when a delimiter is inserted into the message.

9. The computer device of claim 7 wherein the message generating device is configured to generate update messages comprising updated events data for updating a local store of a receiving computer device, the local store holding event data for generating the event.

10. The computer device of claim 1 wherein the associated event is stored with a time delay from which the timing control component determines the first time period.

11. The computer device of claim 1 wherein the events library comprises a first triggering component identifier in association with a first one of the respective events, wherein the first triggering component identifier is also stored in an events library of a second receiving device in association with the second, different respective event.

12. The computer device of claim 1 which comprises a local store which holds event data for generating each event and is configured to receive at least one update message comprising event data for updating the local store at the receiving device.

13. The computer device of claim 12 configured to receive the at least one update message from a server computer device.

14. A method comprising:
sending a message comprising message data from a message generating device to each of first and second receiving computer devices,
the message comprising a first message part and a second message part, the second message part being for delayed activation relative to the first message part at each of the receiving computer devices,
wherein the first receiving computer device comprises a first events library which stores triggering component identifiers in association with respective events wherein the message data of the message comprises a triggering component which activates a first triggering component identifier of the first events library of the first receiving computer device, the first events library having a first event associated with the triggering component identifier, the first event being perceived at the first receiving computer device and
wherein a second one of the receiver computing devices comprises a second events library in which the triggering component identifier is associated with a second, different event, the second, different event being perceived at the second receiving device responsive to the triggering component in the message.

15. The method of claim 14 wherein the message generating computer device establishes multiple message sessions, each session associated with one or more of the first and second receiving computer devices in a group chat.

16. The method of claim 14 comprising accessing the events library at each of the first and second receiving devices by a session identifier associated with that device, wherein the session identifier and the triggering component identifier is associated with the particular event uniquely determined for that session.

17. The method of claim 14 wherein the message generating computer device sends one or more update message comprising event data for updating the event data in at least one of the first and second events library to modify the event to be perceived at the corresponding first and second receiving device.

18. A method of receiving a message comprising message data, the method comprising:
determining a first time period for delaying activation of a second message part of the message data relative to a first message part of the message data when the message is to be perceived by a user;
determining a triggering component in the message data;
using the triggering component to identify a triggering component identifier which is stored in an events library in association with a particular event; and
causing the associated event to be perceived in the second message part of the message data wherein the particular event does not form part of the message data.

19. The method of claim 18 comprising receiving at least one of a user identifier and a session identifier associated with the message and accessing the events library using the at least one of the user identifier and session identifier to cause the associated event to be perceived.

* * * * *